United States Patent [19]
Kastner

[11] 3,828,350
[45] Aug. 6, 1974

[54] AUTOMOBILE ANTENNA INSTALLATION
[75] Inventor: William G. Kastner, St. James, Mo.
[73] Assignee: The Raymond Lee Organization, New York, N.Y.; a part interest
[22] Filed: Mar. 27, 1973
[21] Appl. No.: 345,261

[52] U.S. Cl. .............................................. 343/715
[51] Int. Cl. ............................................ H01q 1/32
[58] Field of Search ........... 343/711, 712, 713, 715, 343/721

[56] References Cited
UNITED STATES PATENTS
1,844,548  2/1932  Hammerl ........................ 343/713
3,321,762  5/1967  Zucconi ........................... 343/721
3,492,769  2/1970  Olson ............................... 343/713

Primary Examiner—Eli Lieberman
Attorney, Agent, or Firm—Daniel Jay Tick

[57] ABSTRACT

An antenna installation for coupling an antenna to radio equipment in a vehicle comprises electrically conductive metal tubing affixed to the roof between the roof and the head liner of the vehicle, extending between the antenna and the radio equipment and adapted to accommodate an electrical conductor therein.

2 Claims, 1 Drawing Figure

PATENTED AUG 6 1974
3,828,350
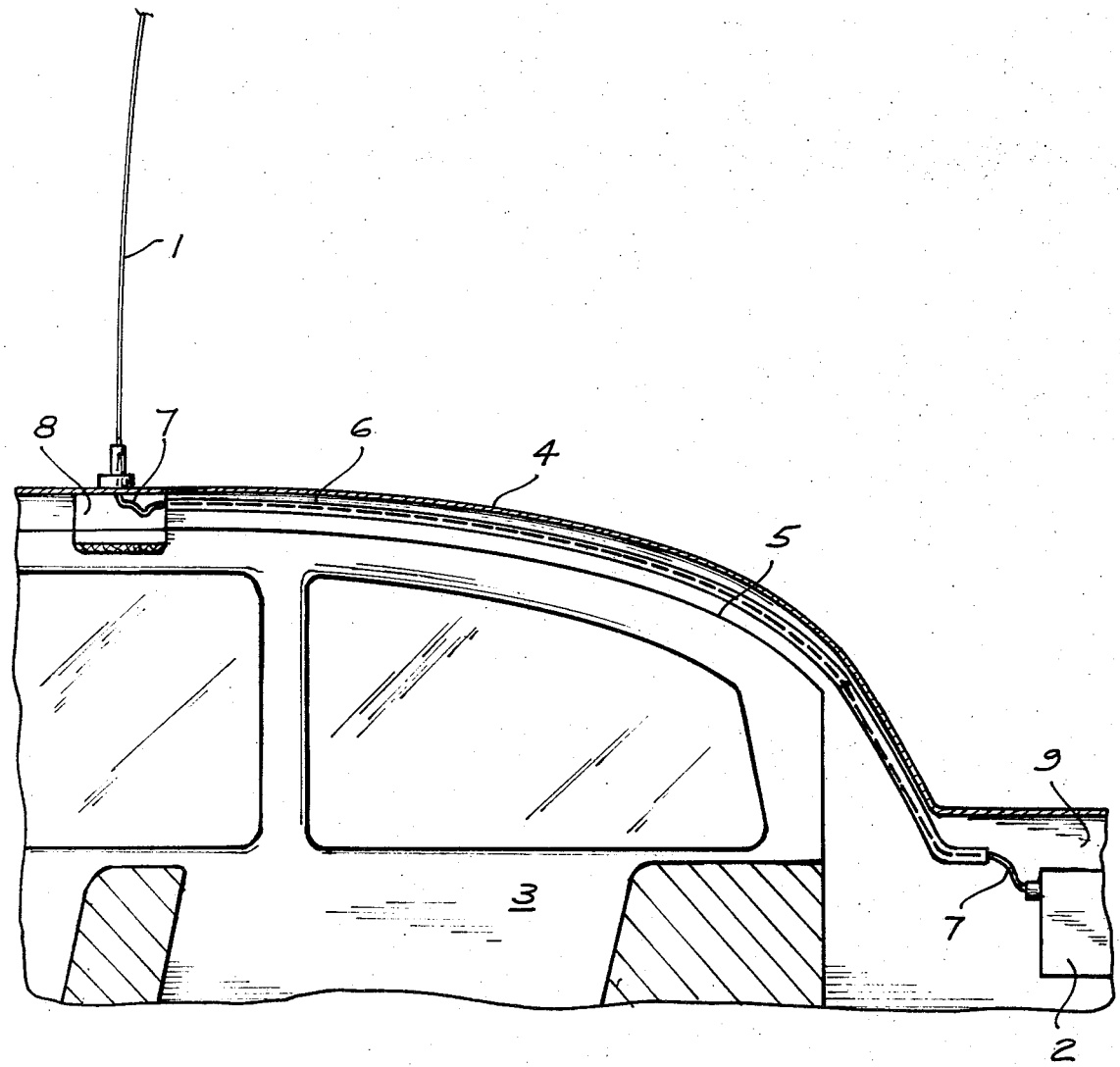

AUTOMOBILE ANTENNA INSTALLATION

DESCRIPTION OF THE INVENTION

The present invention relates to an antenna installation. More particularly, the invention relates to an antenna installation for coupling an antenna to radio equipment in a vehicle.

The principal object of the invention is to provide an antenna installation of simple structure which enables immediate and convenient installation of radio equipment into a vehicle, such as an automotive vehicle or an aircraft, without disruption or modification of existing parts of the vehicle.

In order that the invention may be readily carried into effect, it will now be described with reference to the accompanying drawing, wherein the single FIGURE is a side view, partly in section, of an embodiment of the antenna installation of the invention installed in an automotive vehicle.

As shown in the FIGURE, the antenna installation of the invention is for coupling an antenna 1 to radio equipment 2 in a vehicle 3 having a metal roof 4. A head liner 5 is provided in the usual manner in a cab under the roof 4. The antenna 1 extends from the roof 4 and the radio equipment 2 is provided in the vehicle outside the cab. This is the usual structure of an automotive vehicle and an aircraft.

The antenna installation of the invention comprises electrically conductive metal tubing 6 of copper, aluminum, or the like, affixed to the roof 4 between said roof and the head liner 5. The metal tubing 6 extends between the antenna 1 and the radio equipment 2 and is adapted to accommodate an electrical conductor 7 therein. The electrical conductor 7 is a coaxial cable electrically connected between the antenna 1 and the radio equipment 2.

The vehicle has a light fixture 8 on the roof 4 in the cab and the antenna 1 extends from the light fixture. The tubing 6 extends from the light fixture 8 to the radio equipment 2.

If the vehicle is an automotive vehicle, it has a trunk 9, as shown in the FIGURE, and the radio equipment 2 is in the trunk. In this case, the tubing 6 turns toward a corner post at the rear of the cab in order to clear the rear window of the vehicle.

If the vehicle is an aircraft (not shown in the FIGURE), it has a fuselage having a cockpit. The radio equipment 2 is then in the fuselage out of the cockpit. The light fixture is in the cockpit.

While the invention has been described by means of a specific example and in a specific embodiment, I do not wish to be limited thereto, for obvious modifications will occur to those skilled in the art without departing from the spirit and scope of the invention.

I claim:

1. An antenna installation for coupling an antenna to radio equipment in a vehicle having a metal roof, a head liner in a cab under the roof, a light fixture on the roof in the cab, an antenna extending from the light fixture outside the roof and radio equipment outside the cab, said antenna installation comprising electrically conductive metal tubing affixed to the roof between the roof and the head liner, extending between the antenna at the light fixture and the radio equipment and adapted to accommodate a flexible coaxial cable therein.

2. An antenna installation as claimed in claim 1, wherein the vehicle is an automotive vehicle having a trunk, the radio equipment being mounted in the trunk.

* * * * *